US012070073B2

(12) United States Patent
Lee et al.

(10) Patent No.: US 12,070,073 B2
(45) Date of Patent: Aug. 27, 2024

(54) AEROSOL GENERATING APPARATUS INCLUDING SUSCEPTOR ASSEMBLY

(71) Applicant: KT&G CORPORATION, Daejeon (KR)

(72) Inventors: Won Kyeong Lee, Gyeonggi-do (KR); Heon Jun Jeong, Seoul (KR); Dong Sung Kim, Seoul (KR); Jae Sung Choi, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 401 days.

(21) Appl. No.: 17/607,073

(22) PCT Filed: Jul. 1, 2021

(86) PCT No.: PCT/KR2021/008373
§ 371 (c)(1),
(2) Date: Oct. 28, 2021

(87) PCT Pub. No.: WO2022/005230
PCT Pub. Date: Jan. 6, 2022

(65) Prior Publication Data

US 2023/0165310 A1 Jun. 1, 2023

(30) Foreign Application Priority Data

Jul. 1, 2020 (KR) ........................ 10-2020-0081004

(51) Int. Cl.
*A24F 40/20* (2020.01)
*A24F 40/465* (2020.01)
*H05B 6/10* (2006.01)

(52) U.S. Cl.
CPC ............ *A24F 40/465* (2020.01); *A24F 40/20* (2020.01); *H05B 6/108* (2013.01)

(58) Field of Classification Search
None
See application file for complete search history.

(56) References Cited

U.S. PATENT DOCUMENTS

2017/0055583 A1 3/2017 Blandino et al.
2017/0071249 A1 3/2017 Ampolini et al.
(Continued)

FOREIGN PATENT DOCUMENTS

CN 204888733 U 12/2015
CN 206923683 U 1/2018
(Continued)

OTHER PUBLICATIONS

International Search Report of PCT/KR2021/008373 dated Oct. 7, 2021 [PCT/ISA/210].
(Continued)

*Primary Examiner* — Tho D Ta
(74) *Attorney, Agent, or Firm* — Sughrue Mion, PLLC

(57) ABSTRACT

An aerosol generating apparatus according to an embodiment includes a susceptor arranged to surround an aerosol generating article, and comprising a first layer including a magnetic material and a second layer including a first non-magnetic metal material; an induction coil configured to form a time-varying magnetic field in the susceptor assembly; a battery configured to supply power to the induction coil; and a processor configured to control the power supplied to the induction coil from the battery.

15 Claims, 3 Drawing Sheets

(56) References Cited

U.S. PATENT DOCUMENTS

| | | | |
|---|---|---|---|
| 2018/0184713 | A1 | 7/2018 | Mironov et al. |
| 2018/0352858 | A1 | 12/2018 | Rojo-Calderon |
| 2020/0029623 | A1 | 1/2020 | Rossoll et al. |
| 2020/0054069 | A1 | 2/2020 | Blandino et al. |
| 2020/0093179 | A1 | 3/2020 | Rossoll et al. |
| 2020/0163384 | A1 | 5/2020 | Rossoll et al. |
| 2020/0268053 | A1 | 8/2020 | Thorsen et al. |
| 2021/0084980 | A1 | 3/2021 | Lee et al. |
| 2021/0093009 | A1 | 4/2021 | Park et al. |
| 2022/0160040 | A1 | 5/2022 | Zhang et al. |

FOREIGN PATENT DOCUMENTS

| | | | | | |
|---|---|---|---|---|---|
| CN | 107770883 | A | | 3/2018 | |
| CN | 208064490 | U | | 11/2018 | |
| CN | 110584216 | A | | 12/2019 | |
| CN | 209788481 | U | | 12/2019 | |
| CN | 209807155 | U | | 12/2019 | |
| CN | 110638113 | A | | 1/2020 | |
| EP | 3598905 | B1 | | 5/2023 | |
| JP | 2011-146429 | A | | 7/2011 | |
| JP | 3177414 | U | | 8/2012 | |
| KR | 10-2019-0131555 | A | | 11/2019 | |
| KR | 10-2020-0011375 | A | | 2/2020 | |
| KR | 10-2020-0026317 | A | | 3/2020 | |
| KR | 10-2020-0041507 | A | | 4/2020 | |
| KR | 10-2020-0044022 | A | | 4/2020 | |
| WO | 2018/019738 | A1 | | 2/2018 | |
| WO | 2018/178216 | A1 | | 10/2018 | |
| WO | 2018/211084 | A1 | | 11/2018 | |
| WO | 2018/224339 | A1 | | 12/2018 | |
| WO | 2018/227790 | A1 | | 12/2018 | |
| WO | 2019/030000 | A1 | | 2/2019 | |
| WO | 2019/033251 | A1 | | 2/2019 | |
| WO | 2020/064683 | A1 | | 4/2020 | |
| WO | 2020/064686 | A1 | | 4/2020 | |
| WO | WO-2020064682 | A1 | * | 4/2020 | ............... A24D 1/02 |
| WO | WO-2020064683 | A1 | * | 4/2020 | ............... A24D 1/20 |
| WO | WO-2020064684 | A1 | * | 4/2020 | ............... A24D 1/20 |
| WO | WO-2020064685 | A1 | * | 4/2020 | ............... A24D 1/20 |
| WO | WO-2020064686 | A1 | * | 4/2020 | ............... A24D 1/20 |
| WO | 2020/116798 | A1 | | 6/2020 | |
| WO | 2020/122428 | A1 | | 6/2020 | |

OTHER PUBLICATIONS

Written Opinion of PCT/KR2021/008373 dated Oct. 7, 2021 [PCT/ISA/237].

Extended European Search Report dated May 19, 2022 in European Application No. 21794076.6.

Communication dated Jul. 25, 2023 issued by the Japanese Patent Office in application No. 2021-573803.

Office Action issued Apr. 24, 2023 in Chinese Application No. 202180004151.2.

Chinese Office Action dated Jan. 23, 2024 in Application No. 202180004151.2.

* cited by examiner

[Fig. 1]
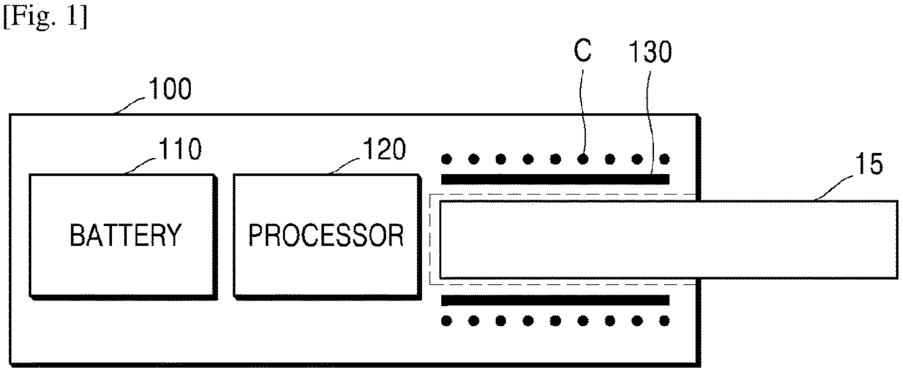
[Fig. 2]
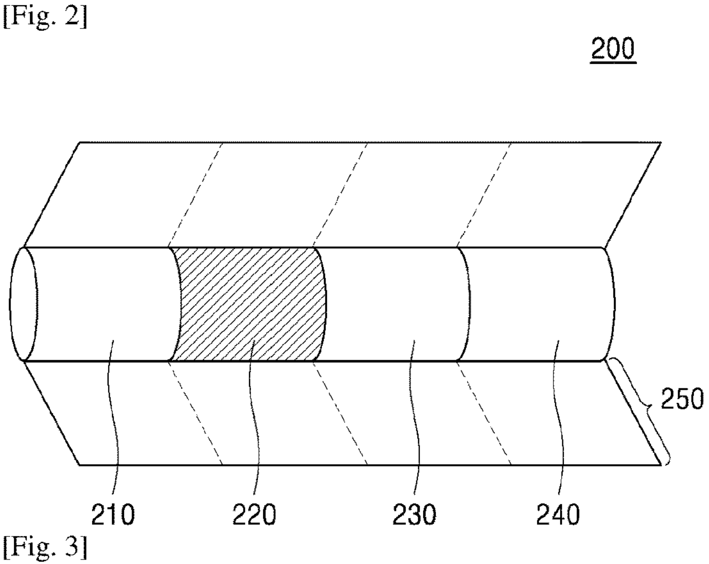
[Fig. 3]
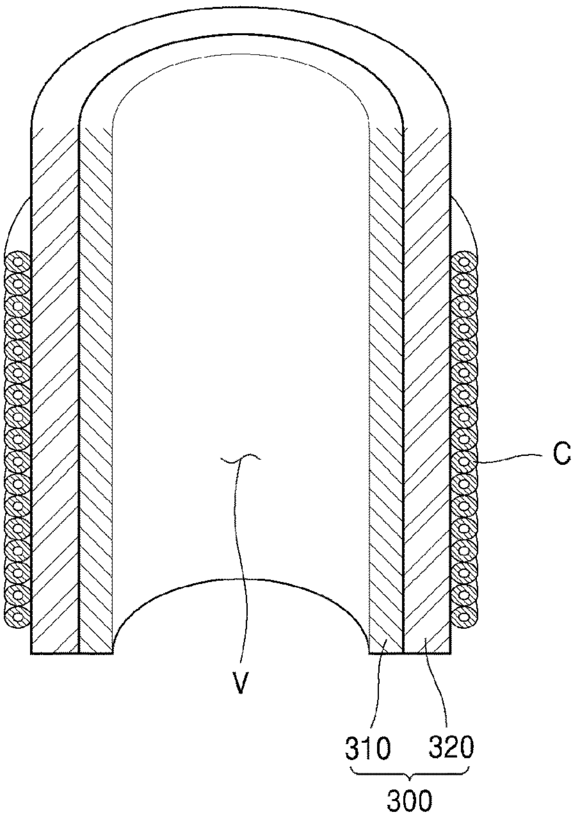

[Fig. 4]
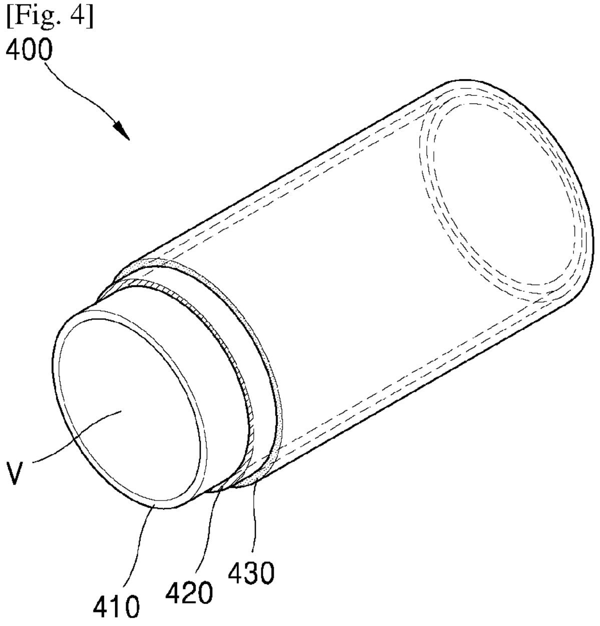
[Fig. 5]
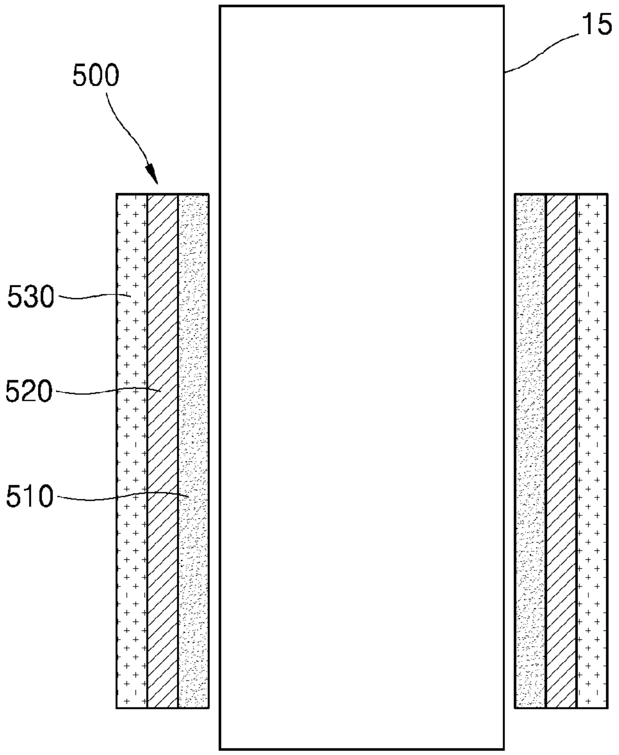

[Fig. 6]
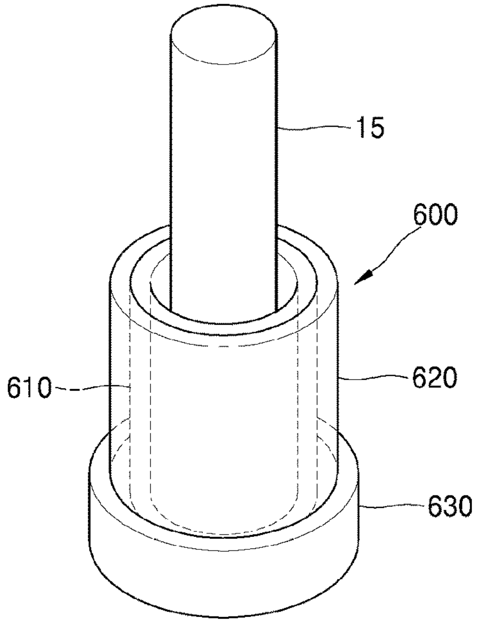
[Fig. 7]
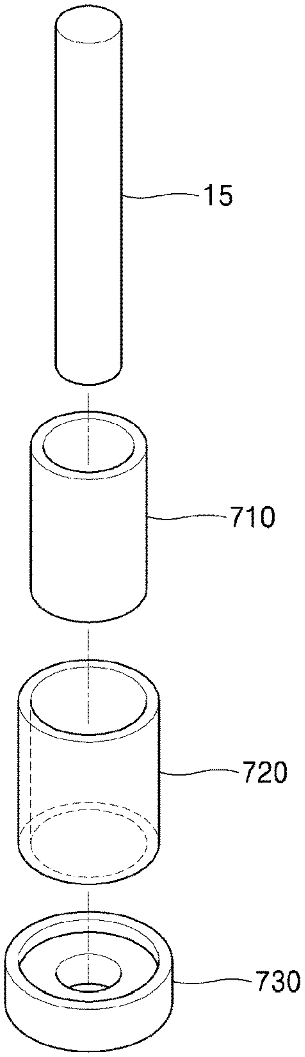

AEROSOL GENERATING APPARATUS INCLUDING SUSCEPTOR ASSEMBLY

CROSS REFERENCE TO RELATED APPLICATIONS

This application is a National Stage of International Application No. PCT/KR2021/008373 filed on Jul. 1, 2021, claiming priority based on Korean Patent Application No. 10-2020-0081004 filed on Jul. 1, 2020.

TECHNICAL FIELD

The present disclosure relates to an aerosol generating apparatus including a susceptor assembly.

BACKGROUND ART

Recently, the demand for alternative methods to overcome the disadvantages of traditional cigarettes has increased. For example, there is growing demand for an generating apparatus which generates an aerosol by heating an aerosol generating material, instead of combusting cigarettes. Accordingly, researches on an aerosol generating apparatus have been actively conducted.

In general, aerosol generating apparatuses use electrical resistance-type heating devices to heat aerosol generating articles containing the aerosol generating material. However, recently, some products have emerged which heat the aerosol generating material by induction heating, using a susceptor and an induction coil.

DISCLOSURE OF INVENTION

Technical Problem

When a susceptor and a thermal insulation member are separately provided in an aerosol generating apparatus, the susceptor may not be heated to a sufficiently high temperature because the heating temperature is restricted by a melting point of the thermal insulation member.

Accordingly, there is a need for aerosol generating apparatuses that may heat aerosol generating articles to an appropriate temperature by induction heating to efficiently heat the aerosol generating articles, while properly blocking the generated heat from being released to the outside.

Solution to Problem

According to an aspect of the present disclosure, an aerosol generating apparatus includes a susceptor arranged to surround an aerosol generating article, and comprising a first layer including a magnetic material and a second layer including a first nonmagnetic metal material; an induction coil configured to form a time-varying magnetic field in the susceptor assembly; a battery configured to supply power to the induction coil; and a processor configured to control the power supplied to the induction coil from the battery.

Advantageous Effects of Invention

An aerosol generating apparatus according to the present disclosure may include a susceptor assembly including a first layer including a magnetic material and a second layer including a non-magnetic metal material. The first layer including the magnetic material of the susceptor assembly may be heated to a relatively high temperature, and the second layer including the non-magnetic metal material may prevent heat from being released to the outside. Accordingly, the first layer including the magnetic material may heat an aerosol generating article. The aerosol generating article may be efficiently heated because the second layer including the non-magnetic metallic material may prevent heat for heating the aerosol generating article from being released to the outside of the susceptor assembly.

In addition, a single susceptor assembly heats an aerosol generating article while preventing heat for heating the aerosol generating article from being released to the outside. Accordingly, a total volume of an aerosol generating apparatus may be reduced, and the size of an aerosol generating apparatus may be reduced.

BRIEF DESCRIPTION OF DRAWINGS

FIG. 1 is a view illustrating an example in which an aerosol generating article 15 is inserted into an aerosol generating apparatus 100.

FIG. 2 is a view illustrating an example of a cigarette 200 including one or more aerosol generators.

FIG. 3 is a view illustrating a configuration of a susceptor assembly 300 according to an embodiment.

FIG. 4 is a view illustrating a configuration of a susceptor assembly 400 according to another embodiment.

FIG. 5 is a cross-sectional view illustrating an example in which an aerosol generating article 15 is inserted into a susceptor assembly 500 of FIG. 4.

FIG. 6 is a diagram illustrating a configuration of an aerosol generating apparatus according to an embodiment.

FIG. 7 is an exploded view of the aerosol generating apparatus of FIG. 6.

BEST MODE FOR CARRYING OUT THE INVENTION

According to an embodiment, there is provided an aerosol generating apparatus including: a susceptor arranged to surround an aerosol generating article, and comprising a first layer including a magnetic material and a second layer including a first non-magnetic metal material; an induction coil configured to form a time-varying magnetic field in the susceptor assembly; a battery configured to supply power to the induction coil; and a processor configured to control the power supplied to the induction coil from the battery.

In addition, the susceptor assembly may have a total thickness in a range of 0.1 mm to 0.25 mm.

In addition, the first layer may have a thickness in a range of 40% to 70% of a total thickness of the susceptor assembly, and the second layer may have a thickness in a range of 30% to 60% of the total thickness of the susceptor assembly.

In addition, the magnetic material may include stainless steel (STS) 400 series.

In addition, the first non-magnetic metal material may include at least one of STS 300 series, titanium (Ti), bismuth (Bi), and an alloy thereof.

In addition, the magnetic material may include chromium (Cr) and carbon (C).

In addition, when the susceptor assembly is heated by the induction coil, the first layer may be heated to 150° C. or more.

In addition, when the susceptor assembly is heated by the induction coil, the second layer may be heated to 60° C. or less.

In addition, the second layer may have a thermal conductivity in a range of 5 W/m·K to 20 W/m·K.

In addition, the susceptor assembly may further include a third layer including a second non-magnetic metallic material.

In addition, the first layer may form an accommodation space configured to accommodate the aerosol generating article, the second layer may surround the first layer, and the third layer may surround the second layer.

In addition, the first layer may have a thickness in a range of 40% to 70% of a total thickness of the susceptor assembly, the second layer may have a thickness in a range of 20% to 30% of the total thickness of the susceptor assembly, and the third layer may have a thickness in a range of 10% to 30% of the total thickness of the susceptor assembly.

In addition, the first layer may include STS 400 series, the second layer may include titanium, and the third layer may include STS 300 series.

In addition, the second layer may have thermal conductivity in a range of 5 W/m·K to 10 W/m·K, and the third layer may have a thermal conductivity in a range of 10 W/m·K to 20 W/m·K.

In addition, the aerosol generating apparatus may further include a thermal insulation member configured to surround the susceptor assembly.

MODE FOR THE INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

In addition, terms including an ordinal number such as "first" or "second" used in the present specification may be used to describe various components, but the components are not limited by the terms. The terms may be used for the purpose of distinguishing one component from another component.

In addition, throughout the specification, a "susceptor" refers to an object that may be heated by penetration of a time-varying magnetic field.

In addition, throughout the specification, a term "susceptor assembly" indicates an assembly including a susceptor. For example, the susceptor assembly may include a first layer serving as a susceptor and a second layer serving to prevent heat generated by the susceptor from being released to the outside of the susceptor. However, the present disclosure is not limited to the above description.

The term "aerosol generating article" may refer to any article that is designed for smoking by a person puffing on it. The aerosol generating article may include an aerosol generating material that generates aerosols when heated even without combustion. For example, one or more aerosol generating articles may be loaded in an aerosol generating apparatus and generate aerosols when heated by the aerosol generating apparatus. The shape, size, material, and structure of the aerosol generating article may differ according to embodiments. Examples of the aerosol generating article may include, but are not limited to, a cigarette-shaped substrate and a cartridge. Hereinafter, the term "cigarette" (i.e., when used alone without a modifier such as "general," "traditional," or "combustive") may refer to an aerosol generating article which has a shape and a size similar to those of a traditional combustive cigarette.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a view illustrating an example in which an aerosol generating article 15 is inserted into an aerosol generating apparatus 100.

Referring to FIG. 1, an aerosol generating system may include the aerosol generating apparatus 100 and the aerosol generating article 15. The aerosol generating apparatus 100 may include an accommodation space where the aerosol generating article 15 is inserted. The aerosol generating apparatus 100 may generate an aerosol by heating the aerosol generating article 15 inserted into the accommodation space. The aerosol generating article 15 may include an aerosol generating material. FIG. 1 illustrates that the aerosol generating apparatus 100 is used together with the aerosol generating article 15 for the sake of convenient description, but this is only an example. The aerosol generating apparatus 100 may use any suitable aerosol generating article such as a cigarette, but embodiments are not limited thereto. Also, different types of aerosol generating articles (e.g., a cigarette and a cartridge) may be used at the same time.

The aerosol generating apparatus 100 may include a battery 110, a processor 120, a susceptor assembly 130, and an induction coil C. However, an internal structure of the aerosol generating apparatus 100 is not limited to the structure illustrated in FIG. 1. Those skilled in the art will appreciate that some of the components illustrated in FIG. 1 may be omitted or a new component may be added thereto depending on the design of the aerosol generating apparatus 100.

The battery 110 may supply power to be used for the aerosol generating apparatus 100 to operate. For example, the battery 110 may supply power such that the induction coil C generates a time-varying magnetic field. In addition, the battery 110 may supply power required for operation of other components included in the aerosol generating apparatus 100, such as the sensor, the user interface, the memory, and the processor 120. The battery 110 may be a rechargeable battery or a disposable battery. For example, the battery 110 may be a lithium polymer (LiPoly) battery, but is not limited thereto.

The processor 120 may generally control operations of the aerosol generating apparatus 100. For example, the processor 120 may control operations of the battery 110, the susceptor assembly 130, and the induction coil C, as well as other components included in the aerosol generating apparatus 10. In addition, the processor 120 may also determine whether or not the aerosol generating apparatus 100 is in an operable state by checking states of the respective components of the aerosol generating apparatus 100.

A processor 120 may include an array of a plurality of logic gates. For example, the processor 120 may include a microprocessor and a memory in which a program executable in the microprocessor is stored. It will be understood by one of ordinary skill in the art that the processor 120 can be implemented in other forms of hardware.

The susceptor assembly 130 may include a material that is heated when a time-varying magnetic field is applied. For example, the susceptor assembly 130 may include metal or carbon. The susceptor assembly 130 may include at least one of ferrite, ferromagnetic alloy, stainless steel, and aluminum (Al). Also, the susceptor assembly 130 may include at least one of ceramic (e.g., graphite, molybdenum, silicon carbide, niobium, nickel alloy, metal film, or zirconia), a transition metal (e.g., nickel (Ni) or cobalt (Co)), and a metalloid (e.g., boron (B) or phosphorus (P)). However, the present disclosure is not limited thereto.

In one example, the susceptor assembly 130 may have a tubular shape or a cylindrical shape and may be arranged to surround an accommodation space into which the aerosol generating article 15 is inserted. That is, when the aerosol generating article 15 is inserted into the accommodation space of the aerosol generating apparatus 100, the susceptor assembly 130 may surround the aerosol generating article 15. Accordingly, a temperature of the aerosol generating material in the aerosol generating article 15 may be increased by heat transferred from the external susceptor assembly 130. In addition, a plurality of susceptor assemblies 130 may be included in the aerosol generating apparatus 100. The susceptor assembly 130 may be manufactured in various shapes without being limited to the shape illustrated in FIG. 1. The susceptor assembly 130 will be described below in detail with reference to FIG. 2.

The induction coil C may generate a time-varying magnetic field when power is supplied from the battery 110. The time-varying magnetic field generated by the induction coil C may be applied to the susceptor assembly 130, and thereby, the susceptor assembly 130 may be heated. The power supplied to the induction coil C may be adjusted under the control of the processor 120, and a heating temperature of the susceptor assembly 130 may be properly controlled.

In addition, the aerosol generating apparatus 100 may include other components in addition to the battery 110, the processor 120, the susceptor assembly 130, and the induction coil C. For example, the aerosol generating apparatus 10 may further include a cigarette insertion detection sensor (not illustrated), other sensors (for example, temperature detection sensor, puff detection sensor, and so on), a user interface, and a memory device.

For example, the cigarette insertion detection sensor may detect whether or not the aerosol generating article 15 is inserted into an accommodation space of the aerosol generating apparatus 100. The aerosol generating article 15 may include a metal material such as aluminum, and the cigarette insertion detection sensor may be an inductive sensor for detecting a change in magnetic field generated as the aerosol generating article 15 is inserted into the accommodation space. However, the present disclosure is not limited thereto. Alternatively, the cigarette insertion detection sensor may be an optical sensor, a temperature sensor, a resistance sensor, or so on.

As a time-varying magnetic field is generated by the induction coil C, the susceptor assembly 130 may be heated. Accordingly, the aerosol generating article 15 included in the susceptor assembly 130 may be heated, and thus, an aerosol may be generated.

The user interface may provide the user with information about the state of the aerosol generating apparatus 100. The user interface may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating apparatus 100 may include only some of the above-described examples of a user interface. In addition, the aerosol generating apparatus 100 may include a combination of two or more different user interfaces. For example, the aerosol generating apparatus 100 may include a touch screen display capable of receiving an input of a user while outputting visual information on a front side. The touch screen display may include a fingerprint sensor, and user authentication may be performed by the fingerprint sensor.

The memory, as a hardware component configured to store various pieces of data processed in the aerosol generating apparatus 100, may store data processed or to be processed by the processor 120. The memory may include various types of memories; random access memory (RAM), such as dynamic random access memory (DRAM) and static random access memory (SRAM), etc.; read-only memory (ROM); electrically erasable programmable read-only memory (EEPROM), etc. The memory may store an operation time of the aerosol generating apparatus 100, the maximum number of puffs, the current number of puffs, at least one temperature profile, data on a user's smoking pattern, etc.

For example, the aerosol generating article 15 may have, for example, a structure of a general combustion-type cigarette. In this case, the cigarette may include a cut-tobacco portion, a filter portion, and so on. The general combustion-type cigarette may be inserted into the aerosol generating apparatus 100 according to the embodiment.

Alternatively, the aerosol generating article 15 may have a structure different from that of a general combustion-type cigarette. For example, a cigarette 200 illustrated in FIG. 2 may include a first portion 210, a second portion 220, a third portion 230, and a fourth portion 240. Here, at least one of the first portion 210 and the second portion 220 may serve as an aerosol generator and may include at least one of an aerosol generating material and a tobacco material.

The aerosol generating material may include at least one of, for example, glycerin, propylene glycol, ethylene glycol, dipropylene glycol, diethylene glycol, triethylene glycol, tetraethylene glycol, and oleyl alcohol, but is not limited thereto. In addition, the aerosol generator may include other additive materials such as flavoring agents, wetting agents, and/or organic acid. In addition, a flavoring liquid such as menthol or a moisturizer may be added to the aerosol generator by being sprayed. The aerosol generator may not include a tobacco material and may include, for example, a corrugated sheet moistened with a moisturizer such as glycerin.

The tobacco material may also be made of, for example, a tobacco sheet or may also be made of a tobacco strand. In addition, the tobacco material may also be made of a cut tobacco formed by chopping the tobacco sheet. For example, the tobacco material may include a corrugated tobacco sheet, a crimped corrugated tobacco sheet, or a roll-type tobacco sheet.

In one example, the first portion 210 may include a corrugated sheet moistened with an aerosol generating material such as glycerin. In addition, the second portion 220 may include an aerosol generating material and a tobacco material including nicotine. However, the present disclosure is not limited thereto, and the second portion 220 may include only a tobacco material including nicotine without including an aerosol generating material, in which case nicotine is vaporized into an aerosol as the second portion 220 is heated.

In another example, only one of the first portion 210 and the second portion 220 may include an aerosol generating material and/or a tobacco material, and the other may serve as a front end plug or a spacer (i.e., supporting element).

In an embodiment in which the first portion 210 includes an aerosol generating material and the second portion 220 includes a tobacco material, when the cigarette 200 is completely inserted into the aerosol generating apparatus, at least part of each of the first portion 210 and the second portion 220 may be inside the aerosol generating apparatus, and at least part of the third portion 230 may be exposed outside the aerosol generating apparatus. A user may inhale an aerosol with the fourth portion 240 put in his/her mouth. At this time, the aerosol is generated from the first portion 210, and the generated aerosol passes through the second portion 220 and the third portion 230 along air flowing into the cigarette 200 to be delivered to the user's mouth. The second portion 220 includes a tobacco material, and thus, nicotine generated from the second portion 220 may be entrained by the aerosol.

In one example, external air may be introduced through at least one air passage formed in the aerosol generating apparatus. For example, a user may control opening and closing of the air passage formed in the aerosol generating apparatus and adjust a size of the air passage. Accordingly, the amount of atomization and smoking feeling may be adjusted by the user. In another example, external air may also be introduced into the cigarette 200 through at least one hole formed in a surface of the cigarette 200.

In addition, at least one of the first portion 210 and the second portion 220 may be surrounded by a thermally conductive material. For example, the thermally conductive material may include a metal foil such as an aluminum foil, but it is not limited thereto. For example, the thermally conductive material surrounding at least one of the first portion 210 and the second portion 220 may spread heat transferred to at least one of the first portion 210 and the second portion 220, and thus, a thermal conductivity of a tobacco rod may be increased, and cigarette taste may be improved.

The third portion 230 may be made of a polymer material or a biodegradable polymer material and may have a cooling function. For example, the third portion 230 may be made of only pure polylactic acid but is not limited thereto. Alternatively, the third portion 230 may be made of a cellulose acetate filter having a plurality of holes. However, the third portion 230 is not limited to the above-described example and may be made any material as long as the material has a function of cooling an aerosol. For example, the third portion 230 may include a tube filter or a paper pipe including a hollow.

The fourth portion 240 may include a cellulose acetate filter. In addition, there is no limitation on a shape of the fourth portion 240. For example, the fourth portion 240 may be a cylindrical rod or a tube-type rod including a hollow therein. The fourth portion 240 may also be a recess-type rod. If the fourth portion 240 includes a plurality of segments, at least one of the plurality of segments may have a different shape.

The fourth portion 240 may be made to generate flavor. In one example, a flavoring liquid may be sprayed on the fourth portion 240, or a separate fiber coated with the flavoring liquid may be inserted into the fourth portion 240.

The cigarette 200 may be wrapped by a wrapper 250. At least one hole may also be formed in the wrapper 250 such that external air is introduced or internal gas is discharged therethrough. FIG. 3 illustrates the wrapper 250 as a single wrapper, but the wrapper 250 may be a combination of a plurality of wrappers.

FIG. 3 is a view illustrating a configuration of a susceptor assembly according to an embodiment.

Referring to FIG. 3, a susceptor assembly 300 may include a first layer 310 and a second layer 320. The susceptor assembly 300 and the induction coil C of FIG. 3 correspond respectively to the susceptor assembly 130 and the induction coil C of FIG. 1, and thus, redundant descriptions thereof are omitted.

The susceptor assembly 300 may include an accommodation space V into which an aerosol generating article is inserted. The susceptor assembly 300 may have a form of clad metal or ply metal, but it is not limited thereto. The susceptor assembly 300 may include a first layer 310 including a magnetic material and a second layer 320 including a first non-magnetic metal material.

The susceptor assembly 300 may have a cylindrical shape as a whole. However, the present disclosure is not limited thereto and the susceptor assembly 300 may have different shapes which surround the accommodation space V.

As shown in FIG. 3, the second layer 320 may be arranged outside the first layer 310. When an aerosol generating article (not illustrated) is put inside the susceptor assembly 300, the first layer 310 may direct contact an aerosol generating article, and the second layer 320 does not directly contact the aerosol generating article.

In one embodiment, a magnetic material may include stainless steel (STS) 400 series. The STS 400 series may include STS 405, STS 410L, STS 430, STS 434, STS 444, and so on. For example, the first layer 310 may include STS 434.

In addition, the magnetic material may include chromium (Cr) and carbon (C). For example, the first layer 310 may include carbon of about 0.12% or less and chromium of about 16% to about 18% among the total components of the first layer 310, but it is not limited thereto.

In one embodiment, the first non-magnetic metal material may include at least one of STS 300 series, titanium (Ti), bismuth (Bi), and an alloy thereof, but it is not limited thereto. The STS 300 series may include at least one of chromium (Cr), carbon (C), manganese (Mn), molybdenum (Mo), nickel (Ni), and silicon (Si). The STS 300 series may include STS 304, STS 316, STS 316L, and so on. For example, the second layer 320 may include STS 316L.

In one embodiment, the susceptor assembly 300 may have a thickness of about 0.1 mm to about 0.25 mm. For example, the total thickness including the first layer 310 and the second layer 320 of the susceptor assembly 300 may be about 0.15 mm.

In addition, the first layer 310 may have a thickness in a range of 40% to 70% of the total thickness of the susceptor assembly 300, and the second layer 320 may have a thickness in a range of 30% to 60% of the total thickness of the susceptor assembly 300. For example, when the total thickness of the susceptor assembly 300 is 0.2 mm, the thickness of the first layer 310 may be 0.14 mm, and the thickness of the second layer 320 may be 0.06 mm, but the present disclosure is not limited thereto. If the first layer 310 and the second layer 320 have the thicknesses in the above-described range, the heating efficiency and the thermal insulation effect of the susceptor assembly 300 may be improved.

When power is supplied to the induction coil C, a magnetic field may be generated inside the induction coil C. When an alternating current is applied to the induction coil C from the battery, the magnetic field formed in the induction coil C may periodically change its direction. When the susceptor assembly 300 is exposed to the alternating magnetic field, the first layer 310 including a magnetic material may generate heat. An aerosol generating article inserted into the accommodation space V may be heated by the generated heat. On the other hand, the second layer 320 made of a first nonmagnetic metal material is not magnetic, and thus, almost no heat is generated.

In one embodiment, when the susceptor assembly 300 is heated by the induction coil C, the first layer 310 may be heated to about 150° C. or more. For example, when the first layer 310 is heated to about 250° C., the aerosol generating article may be heated to about 245° C. by the first layer 310. In this case, the second layer 320 may be heated to about 60° C. or less. For example, the second layer 320 may be heated to about 30° C.

In one embodiment, the second layer 320 may have a thermal conductivity in a range of 5 W/m·K to 20 W/m·K. The second layer 320 has a low thermal conductivity, and thus, when the first layer 310 is heated, heat of the first layer 310 may be prevented from being released to the outside of the susceptor assembly 300.

In addition, the second layer 320 of FIG. 3 is illustrated as a single layer but may include a plurality of layers. Each of the plurality of layers of the second layer 320 may include the first non-magnetic metal material, and the first non-magnetic metal materials included in the respective layers of the second layer 320 may be the same as or different from each other. For example, the second layer 320 may include an STS 304 layer, an STS 316 layer, and a titanium layer, but it is not limited thereto.

The induction coil C and the susceptor assembly 300 of FIG. 3 are illustrated to be in close contact with each other, but they may be spaced apart from each other according to embodiments.

In one embodiment, the first layer 310 may face the accommodation space V, and the second layer 320 may face the outer surface of the first layer 310. The first layer 310 of the susceptor assembly 300 may include a magnetic material, and heat may be generated by a magnetic field generated from the induction coil C. The first layer 310 faces the accommodation space V into which an aerosol generating article is inserted, and thus, heat generated from the first layer 310 may heat the aerosol generating article. The second layer 320 includes a non-magnetic metal material and has a low thermal conductivity, and thus, heat is hardly generated by the magnetic field generated from the induction coil C. The second layer 320 surrounds the first layer 310, and thus, heat generated from the susceptor assembly 300 may be prevented from being released to the outside of the susceptor assembly 300.

FIG. 4 is a view illustrating a configuration of a susceptor assembly 400 according to another embodiment.

Referring to FIG. 4, the susceptor assembly 400 may further include a third layer 430. The susceptor assembly 400, a first layer 410, and a second layer 420 of FIG. 4 correspond respectively to the susceptor assembly 300, the first layer 310, and the second layer 320 of FIG. 3, and thus, redundant descriptions thereof are omitted.

The third layer 430 may include a second non-magnetic metal material. The second non-magnetic metal material may include at least one of STS 300 series, titanium (Ti), bismuth (Bi), and an alloy thereof, but it is not limited thereto. The STS 300 series may include at least one of chromium (Cr), carbon (C), manganese (Mn), molybdenum (Mo), nickel (Ni), and silicon (Si). Examples of the STS 300 series may include STS 304, STS 316, STS 316L, and so on. For example, the third layer 430 may include STS 316L.

The third layer 430 and the second layer 420 may include different materials from each other or may include the same material. In addition, contents of materials included in the third layer 430 and the second layer 420 may be different from each other. For example, the second layer 420 and the third layer 430 may each include a titanium alloy. As another example, the second layer 420 may include the STS 300 series, and the third layer 430 may include bismuth. As another example, a percentage of chromium included in the second layer 420 may be about 17%, and a percentage of chromium included in the third layer 430 may be about 19%.

The susceptor assembly 400 may have the total thickness in a range of about 0.1 mm to about 0.25 mm. For example, the total thickness of the susceptor assembly 400 including the first layer 410, the second layer 420, and the third layer 430 may be about 0.25 mm, but it is not limited thereto.

In one embodiment, the first layer 410 may have a thickness in a range of 40% to 70% of the total thickness of the susceptor assembly 400. The second layer 420 may have a thickness in a range of 20% to 30% of the total thickness of the susceptor assembly 400. The third layer 430 may have a thickness in a range of 10% to 30% of the total thickness of the susceptor assembly 400. For example, when the total thickness of the susceptor assembly 400 is 0.25 mm, a thickness of the first layer 410 is 0.15 mm, a thickness of the second layer 420 is 0.05 mm, and a thickness of the third layer 430 may be 0.05 mm, but embodiments are not limited thereto. If the first layer 410, the second layer 420, and the third layer 430 have thicknesses in the above-described ranges, the heating efficiency and the thermal insulation effect of the susceptor assembly 400 may be improved.

In one embodiment, the first layer 410 may include STS 400 series, the second layer 420 may include titanium, and the third layer 430 may include STS 300 series. For example, the first layer 410 of the susceptor assembly 400 may include STS 434, the second layer 420 may include Ti-6AL-4V, and the third layer 430 may include STS 316L.

In one embodiment, the first layer 410 of the susceptor assembly 400 may face the accommodation space V into which an aerosol generating article is inserted, the second layer 420 may surround the first layer 410, and the third layer 430 may surround the second layer 420. The first layer 410 may include a magnetic material, the second layer 420 may include a first non-magnetic metal material, and a third layer 430 may include a second non-magnetic metal material.

The second layer 420 may have a thermal conductivity in a range of 5 W/m·K 10 W/m·K, and the third layer 430 may have a thermal conductivity in a range of 10 W/m·K to 20 W/m·K. The second layer 420 and the third layer 430 have a low thermal conductivity, and thus, heat generated from the first layer 410 may be prevented from being released to the outside of the susceptor assembly 400.

In addition, FIG. 4 illustrates that the first layer 410 is longer than the second layer 420, and the second layer 420 is longer than the third layer 430 of the susceptor assembly 400. However, this is an example adopted to show the layer structure of the susceptor assembly 400, and the first layer 410, the second layer 420, and the third layer 430 may each have any suitable length.

FIG. 5 is a cross-sectional view illustrating an example in which an aerosol generating article 15 is inserted into a susceptor assembly 500 of FIG. 4.

Referring to FIG. 5, the susceptor assembly 500 may include a first layer 510, a second layer 520, and a third layer 530. The first layer 510 may face the aerosol generating article 15. The aerosol generating article 15 of FIG. 5 corresponds to the aerosol generating article 15 of FIG. 1. Also, the susceptor assembly 500, the first layer 510, the second layer 520, and the third layer 530 of FIG. 5 correspond respectively to the susceptor assembly 400, the first layer 410, the second layer 420, and the third layer 430 of FIG. 4, and thus, redundant descriptions thereof are omitted.

FIG. 6 is a view illustrating a configuration of an aerosol generating apparatus according to an embodiment.

Referring to FIG. 6, an aerosol generating apparatus 600 may further include a thermal insulation member 620. The aerosol generating article 15 and the susceptor assembly 610 of FIG. 6 correspond respectively to the aerosol generating article 15 and the susceptor assembly 500 of FIG. 5, and thus, redundant descriptions thereof are omitted.

The thermal insulation member 620 may be formed of an insulating material to prevent heat generated from the susceptor assembly 610 from being transferred to the outside. The thermal insulation member 620 may include at least one of aerogel, vacuum insulation, silicone foam material, rubber material, filler, nylon, fleece, nonwoven material, textile material, polystyrene, polyester, polyester filament, corrugated material, polypropylene, a mixture of polyester and polypropylene, and cellulose acetate.

An air layer may be formed between the susceptor assembly 610 and the thermal insulation member 620. The air layer may refer to a gap between the susceptor assembly 610 and the thermal insulation member 620, and it may be omitted as necessary.

In one embodiment, the thermal insulation member 620 may include aerogel. The aerogel may be obtained by replacing a liquid with gas without causing shrinkage in a gel structure and may be made from various materials such as silica, aluminum (Al), chromium (Cr), and tin (Sn).

In one embodiment, the thermal insulation member 620 may have a thermal conductivity of about 0.25 W/m·K or less, preferably, a thermal conductivity of 0.004 W/m·K to about 0.25 W/m·K.

The thermal insulation member 620 may surround an induction coil or may be disposed between the induction coil and the susceptor assembly 610, but the present disclosure is not limited thereto.

In one embodiment, the aerosol generating apparatus 600 may further include a support member 630. The support member 630 may be a bracket capable of fixing at least one of the susceptor assembly 610 and the thermal insulation member 620. The susceptor assembly 610 and the thermal insulation member 620 may be mounted and fixed in a groove of the support member 630.

The support member 630 may be made of a heat-resistant material, and the heat-resistant material may include a material capable of withstanding heat of about 250° C. or more. In other words, a melting point Tm of the heat-resistant material may be about 250° C. or more.

In addition, the heat-resistant material may be a heat-resistant synthetic resin. In this case, at least one of the melting point and a glass transition temperature Tg of the heat-resistant material may be about 250° C. or more.

For example, the heat-resistant material may include at least one of, for example, polypropylene, polyetheretherketone (PEEK), polyethylene, polypropylene, polyethylene terephthalate, polycyclohexylenedimethylene terephthalate, polyimide, sulfone-based resin, fluorine-based resin, and aramid. The sulfone-based resin may include a resin such as polyethersulfone or polyphenylene sulfide, and the fluorine-based resin may include polytetrafluoroethylene (i.e., Teflon). However, the present disclosure is not limited thereto, and in one example, the heat-resistant material may be any suitable material capable of withstanding heat of about 300° C. or more.

FIG. 7 is an exploded view of the aerosol generating apparatus of FIG. 6.

Referring to FIG. 7, the aerosol generating apparatus may include a susceptor assembly 710, a thermal insulation member 720, and a support member 730. The aerosol generating article 15, the susceptor assembly 710, the thermal insulation member 720, and the support member 730 of FIG. 7 correspond respectively to the aerosol generating article 15, the susceptor assembly 610, the thermal insulation member 620, and the support member 630 of FIG. 6, and thus, redundant descriptions thereof are omitted.

In one embodiment, the susceptor assembly 710 may surround the aerosol generating article 15, and the thermal insulation member 720 may surround the susceptor assembly 710. That is, the components of the aerosol generating apparatus may be arranged from inside to outside in the order of the aerosol generating article 15, the susceptor assembly 710, and the thermal insulation member 720.

Accordingly, heat generated from the susceptor assembly 710 may not be released to the outside of the susceptor assembly 710 by at least one of the second layer and the third layer of the susceptor assembly 710. Also, the heat from the susceptor assembly 710 may not be transferred to the outside by the thermal insulation member 720. Accordingly, a thermal insulation effect may be increased.

Those of ordinary skill in the art related to the present embodiments may understand that various changes in form and details can be made therein without departing from the scope of the characteristics described above. The scope of the present disclosure is defined by the appended claims rather than by the foregoing description, and all differences within the scope of equivalents thereof should be construed as being included in the present disclosure.

The invention claimed is:

1. An aerosol generating apparatus comprising:

a susceptor assembly arranged to surround an aerosol generating article, and comprising a first layer including a magnetic material, and a second layer including a first non-magnetic metal material, wherein the second layer surrounds the first layer;

an induction coil configured to form a time-varying magnetic field in the susceptor assembly;

a battery configured to supply power to the induction coil; and a processor configured to control the power supplied to the induction coil from the battery.

2. The aerosol generating apparatus of claim 1, wherein the susceptor assembly has a total thickness in a range of 0.1 mm to 0.25 mm.

3. The aerosol generating apparatus of claim 1, wherein the first layer has a thickness in a range of 40% to 70% of a total thickness of the susceptor assembly, and the second layer has a thickness in a range of 30% to 60% of the total thickness of the susceptor assembly.

4. The aerosol generating apparatus of claim 1, wherein the magnetic material includes stainless steel (STS) 400 series.

5. The aerosol generating apparatus of claim 1, wherein the first non-magnetic metal material includes at least one of STS 300 series, titanium (Ti), bismuth (Bi), and an alloy thereof.

6. The aerosol generating apparatus of claim 1, wherein the magnetic material includes chromium (Cr) and carbon (C).

7. The aerosol generating apparatus of claim 1, wherein, when the susceptor assembly is heated by the induction coil, the first layer is heated to 150° C. or more.

8. The aerosol generating apparatus of claim 1, wherein, when the susceptor assembly is heated by the induction coil, the second layer is heated to 60° C. or less.

9. The aerosol generating apparatus of claim 1, wherein the second layer has a thermal conductivity in a range of 5 W/m·K to 20 W/m·K.

10. The aerosol generating apparatus of claim 1, wherein the susceptor assembly further comprises a third layer including a second non-magnetic metallic material.

11. The aerosol generating apparatus of claim 10, wherein the first layer forms an accommodation space configured to accommodate the aerosol generating article, and the third layer surrounds the second layer.

12. The aerosol generating apparatus of claim 10, wherein the first layer has a thickness in a range of 40% to 70% of a total thickness of the susceptor assembly, the second layer has a thickness in a range of 20% to 30% of the total thickness of the susceptor assembly, and the third layer has a thickness in a range of 10% to 30% of the total thickness of the susceptor assembly.

13. The aerosol generating apparatus of claim 10, wherein the first layer includes STS 400 series, the second layer includes titanium, and the third layer includes STS 300 series.

14. The aerosol generating apparatus of claim 10, wherein the second layer has thermal conductivity in a range of 5 W/m·K to 10 W/m·K, and the third layer has a thermal conductivity in a range of 10 W/m·K to 20 W/m·K.

15. The aerosol generating apparatus of claim 1, further comprising:

a thermal insulation member surrounding the susceptor assembly.

* * * * *